(12) United States Patent
Forman

(10) Patent No.: US 7,509,231 B1
(45) Date of Patent: Mar. 24, 2009

(54) MEASURING AND DISPLAYING PERFORMANCE, EARNED VALUE AND/OR RISK

(76) Inventor: Ernest Forman, 1438 Ironwood Dr., McLean, VA (US) 22101

(*) Notice: Subject to any disclaimer, the term of this patent is extended or adjusted under 35 U.S.C. 154(b) by 575 days.

(21) Appl. No.: 11/203,139

(22) Filed: Aug. 15, 2005

Related U.S. Application Data

(60) Provisional application No. 60/693,448, filed on Jun. 24, 2005, provisional application No. 60/601,967, filed on Aug. 17, 2004.

(51) Int. Cl.
*G06F 15/00* (2006.01)
*G06F 19/00* (2006.01)

(52) U.S. Cl. .................. 702/182; 702/179; 702/188; 702/189

(58) Field of Classification Search .............. 702/182, 702/188, 189, 179, 181; 715/803–807; 705/7–11, 705/38
See application file for complete search history.

(56) References Cited

U.S. PATENT DOCUMENTS 4,613,946 A * 9/1986 Forman ............... 715/853
6,785,889 B1 * 8/2004 Williams .............. 718/104
6,850,891 B1 * 2/2005 Forman ................. 705/7

* cited by examiner

*Primary Examiner*—Eliseo Ramos Feliciano
*Assistant Examiner*—Phuong Huynh
(74) *Attorney, Agent, or Firm*—David G. Grossman; David Yee

(57) ABSTRACT

Disclosed is an aspect of a computer program that when executed by one or more processors causes the processors to perform steps related to measuring and displaying measures. The steps include: identifying factors; structuring these factors into a hierarchy; identifying at least one activity and decision maker; collecting judgments on factors from the decision makers; producing sets of ratio-scaled measures from the judgment(s); producing performance measure(s) of activities with respect to at least two of the factors; generating a rolled up performance measures by rolling up at least one of the performance measures from the lower levels of the hierarchy to the higher levels of said hierarchy; and communicating the performance measures and the rolled up performance measures.

30 Claims, 17 Drawing Sheets

| Way Ahead of Plan | Ahead of Plan | On Plan | Behind Plan | Way Behind Plan | No Hope |
|---|---|---|---|---|---|
| 1 (1.000000) | 2 (.862069) | 3 (.724428) | 4 (.104084) | 5 (.013225) | 6 (.000000) |

FIG. 5

| On Cost | Slightly Behind | Moderately Behind | Considerably Behind | No Hope |
|---|---|---|---|---|
| 1 (1.000000) | 2 (.892857) | 3 (.671321) | 4 (.125716) | 5 (.000000) |

FIG. 6

| Outstanding | Excellent | Very Good | Good | Moderate | Tad | None |
|---|---|---|---|---|---|---|
| 1 (1.000000) | 2 (.821858) | 3 (.675007) | 4 (.483724) | 5 (.399308) | 6 (.064886) | 7 (.000000) |

FIG. 7

MEASURING AND DISPLAYING PERFORMANCE, EARNED VALUE AND/OR RISK

CROSS-REFERENCE TO RELATED APPLICATIONS

This application claims the benefit of U.S. Provisional Application No. 60/601,967, filed Aug. 17, 2004, entitled "Measuring and Displaying Performance," and U.S. Provisional Application No. 60/693,448, filed Jun. 24, 2005, entitled "Measuring and Displaying Performance and Earned Value," which are hereby incorporated by reference in their entirety.

BRIEF DESCRIPTION OF THE SEVERAL VIEWS OF THE DRAWINGS

The accompanying drawings, which are incorporated in and form a part of the specification, illustrate an embodiment of the present invention and, together with the description, serve to explain the principles of the invention.

FIG. 5 is part of a screenshot showing rating intensities for performance as per an embodiment of an aspect of the present invention.

FIG. 6 is part of a screenshot showing rating intensities for on cost as per an embodiment of an aspect of the present invention.

FIG. 7 is part of a screenshot showing rating intensities for sales revenue as per an embodiment of an aspect of the present invention.

DETAILED DESCRIPTION OF THE INVENTION

Figure 1:
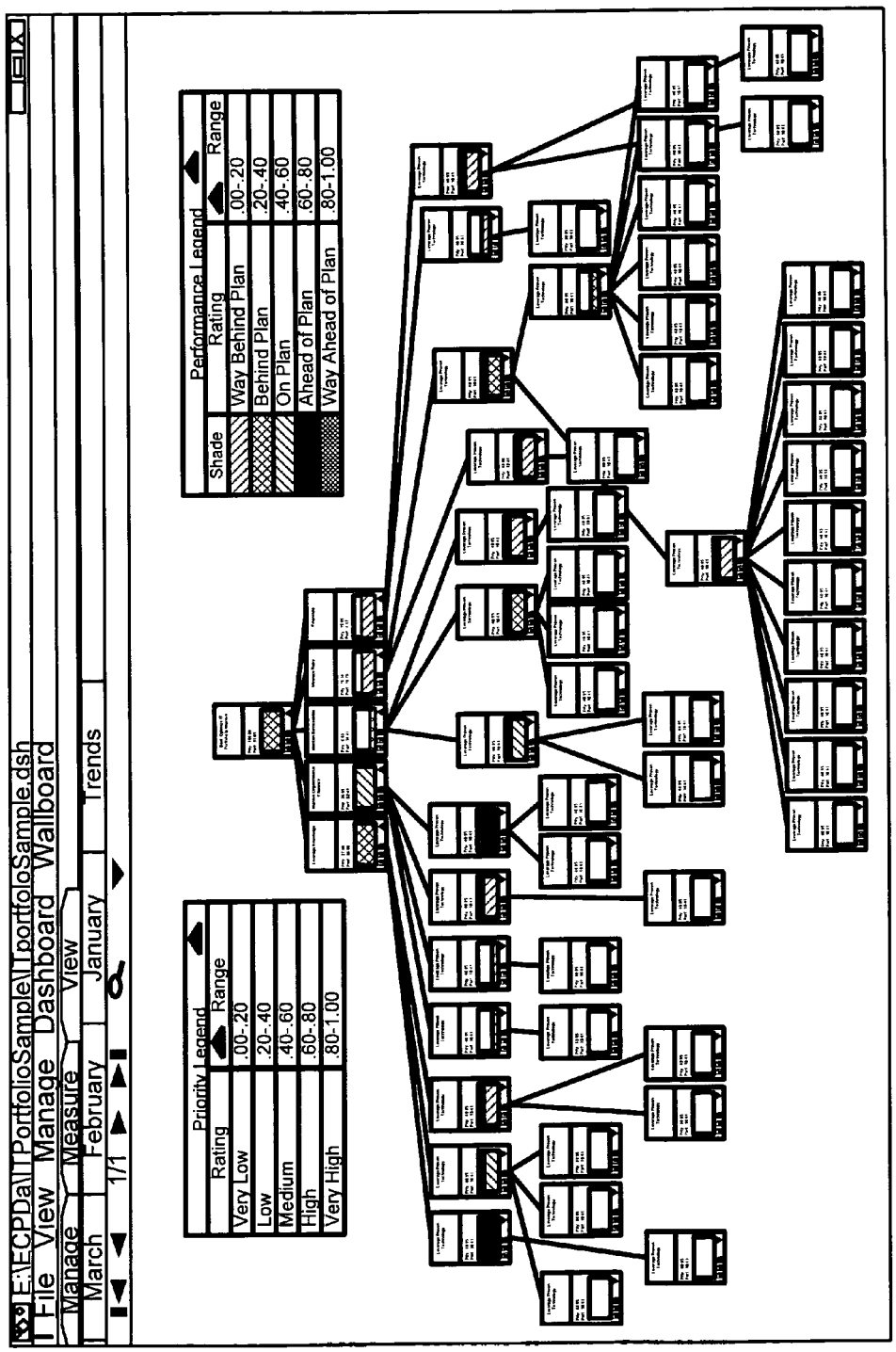
FIG. 1 is a screenshot showing a hierarchy of Factors as per an embodiment of an aspect of the present invention.

Throughout this description, the preferred embodiment and examples shown should be considered as exemplars, rather than as limitations on the present invention. The present invention is a mechanism for measuring and displaying performance, earned value and/or risk. An embodiment of this invention may be implemented as a computer program that could be stored on a tangible computer medium. It is envisioned that the computer program stored on the tangible computer readable medium will perform a series of steps when executed by one or more processors. The steps include: identifying at least two factors (S1305), structuring those factors into a hierarchy (S1310), identifying at least one activity (S1315), identifying at least one decision maker (S1320), collecting at least one judgment from those factors (S1325), producing at least one ratio-scaled measure from the judgment(s) (S1330), producing at least one performance measure from at least one of the activities with respect to at least two of the factors (S1335), generating a rolled up performance measure from the lower levels of the hierarchy to the higher levels of the hierarchy (S1340), and communicating at least one performance measure and one rolled up performance measure (S1345).

A factor is an element or component of a model and may represent or identify an organizational objective and/or sub-objective. To identify a factor, an operator may use an identifying mechanism. This mechanism may, for example, allow an operator to key enter, mouse click or highlight a factor of interest. As one embodiment of the present invention, an operator should identify at least two factors to compare, measure and display. Nodes may include a collection of information. When at least two factors are identified, each of these at least two factors may be represented as a node, as shown in exemplary FIGS. 1 and 2. Each node may be represented on the display screen and in the output report, for example, as a window.

The nodes may be incorporated into a hierarchy. In general, a hierarchy is a structure (such as a tree structure) which has nodes and branches, with the nodes at junctures in the hierarchy. To help identify structural seniority, nodes may be placed in various levels. Nodes in one level may be connected to another node in a lower or higher level by branches. The hierarchy can include a cluster of nodes, as well as elements from, but not limited to, models such as an Analytic Hierarchy Process (AHP) planning, alignment, and/or priority model.

Each node often contains a set of information or a combination of sets of information that can be communicated within a cluster of nodes. For example, a set of information may include a caption, which is sometimes abbreviated/truncated or expanded when a mouse cursor is positioned over the node. It may also contain an information document for that node. One example is a note comprising comments or other attachments added by a particular decision maker. It may even contain a consolidated note, which includes notes from all or a selected subset of decision makers. It may even contain a priority, which generally represents the degree of precedence an objective or activity has with respect to other objectives or activities. Often used for weighting, priorities may be derived using pairwise comparisons or data. Pairwise comparison is a form that often expresses the intensity of dominance or preference of one node over another with respect to a given criterion in the decision making process. Other types of information include performance and note(s).

These kinds of information may be communicated in multiple ways. It may be communicated, displayed or reported numerically, textually, graphically, verbally within a particular range as designated by the operator, or using color codes or shades within a particular range as designated by an operator. It may even be communicated using a combination of these ways.

A root node, generally referred to as the Goal, is usually found at the top of the hierarchy. Illustrating hierarchical levels, the level at which the root node resides may be represented as level 1. Each node immediately connected to the root node is a descendant or child node of the root node. This next generation may be represented as level 2. This may continue from level to level. Preferably, there is no limit as to the number child nodes or levels.

Sometimes an operator may be interested in focusing on a particular level not immediately connected with level 1. For example, an operator may be interested in a level 7 node and its descendents. As such, where two nodes are connected by a branch, the node at the higher level may be deemed as the parent node. The node at the lower level may be deemed as a child node. Overall, each node may have one or more parents, but may have zero, one or more than one child node. It is envisioned that nodes may be repositioned. This may be desirable to increase the clarity of presentations of nodes. For example, nodes may be maneuvered or positioned to be above a parent but still remain properly connected as a child node.

Figure 3:
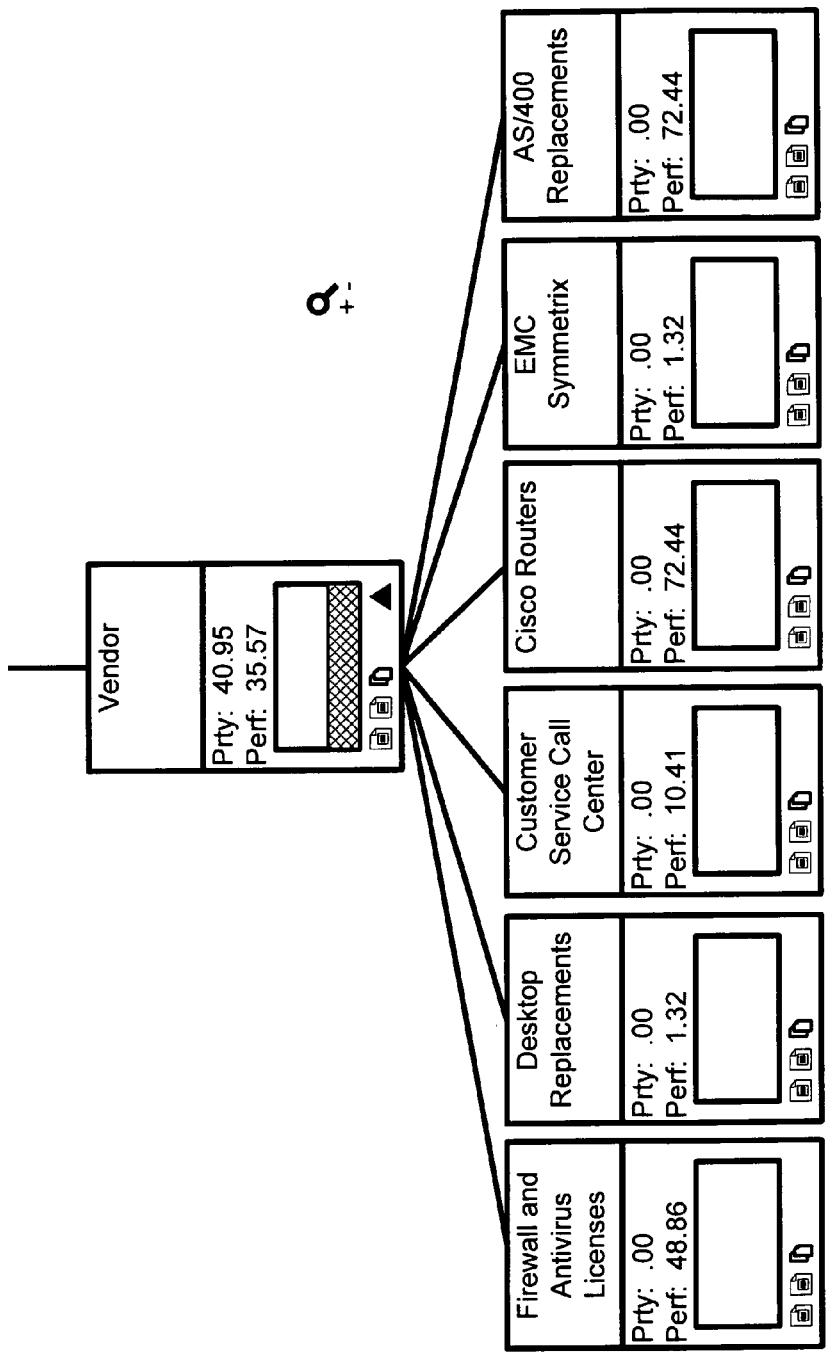
FIG. 3 is part of a screenshot showing activities as per an embodiment of an aspect of the present invention.

Within the hierarchy, one or more activity, displayable at the lowest level of a cluster of nodes, may contribute some benefit, value and/or risk to some or all of the lowest level sub-objectives (sometimes called covering objectives) as shown in FIG. 3. A selection mechanism may be used to specify which activity contributes to which of the covering objectives. The term activity may also be referred to as an alternative. This selection mechanism may include allowing an operator to mouse click on possible activities displayed in a grid or list. A similar mechanism may also be used to specify which participants can evaluate and/or view the priorities of the nodes and/or the activity performance. Serving as decision makers, the specified participants may render a judgment on a particular node.

The present invention may further utilize covering factor(s). A covering factor is usually one of the factors that is at the lowest level of a hierarchy for which at least one activity is selected to contribute.

Judgments may take the form of pairwise comparisons. Any judgment may be alphanumerically expressed verbally or written/typed/mouse clicked. Using a judgment(s) rendered by a decision maker(s), ratio-scaled measures may be derived for the factors or nodes. This process is typical, for instance, in AHP. Ratio-scaled measures generally represent the relative importance of the objectives. In other words, ratio-scaled measures may prioritize objectives with respect to each other. At times, ratio-scaled measures may even represent scenarios, in which case such measures represent the relative likelihood of the scenarios. One example of a ratio-scale is 0 to 1, however, one skilled in the art will recognize that other scales may also be used. In some embodiments, collecting judgment(s) on a factor may be restricted to decision maker who has been selected to evaluate that judgment.

A performance measure of one or more activities based upon at least two factors may also be produced by using a translation function, including but not limited to a direct function, a ratings function, a step function and a utility curve. Generally, a performance measure is a measure that evaluates, indicates, calculates or ranks the result of a particular activity with respect to another activity or factor. For example, a performance measure may include, but is not limited to, performance, earned value and/or risk of an activity of interest. Measures of performance, expressible on a ratio-scale, are assigned or derived for each of activity as shown in FIG. 3.

The step of producing performance measures may include using selected performance measure(s) for each of the activities. In this case, the selected performance measure may be independently selected for each activity from a multitude of performance measures. Selected performance measures may include: a direct assignment of a performance measure (i.e. in a range of 0 to 1) or a derived performance measure. The derived performance measure may be derived from models such as an AHP model or an AHP submodel.

Figure 4:
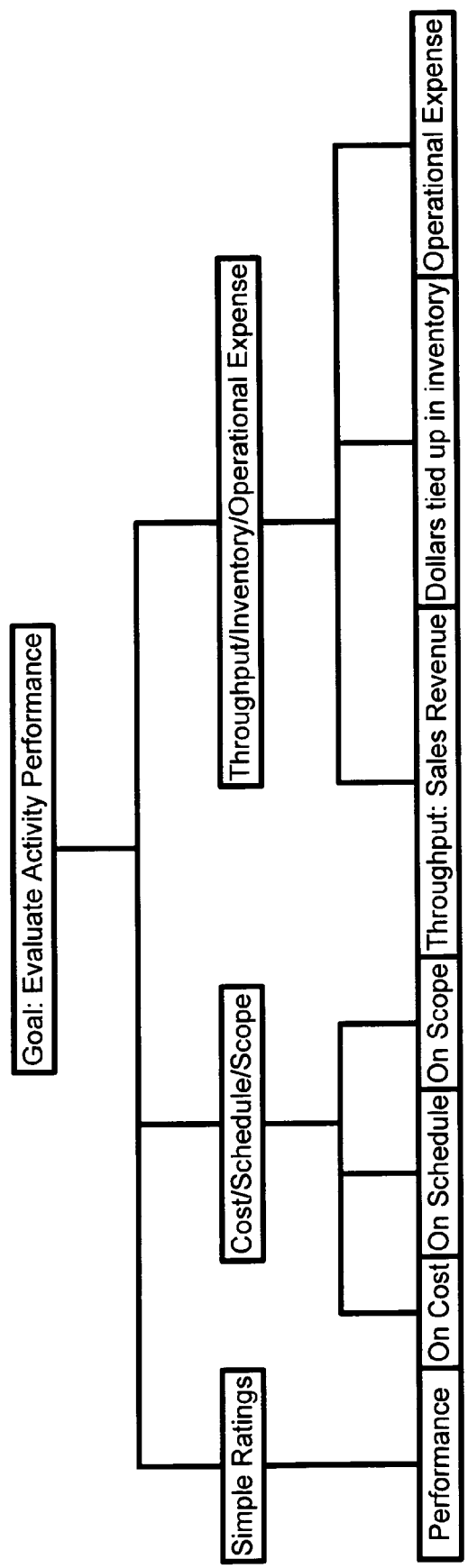
FIG. 4 is part of a screenshot showing activity performance evaluation factors/measures as per an embodiment of an aspect of the present invention.
Figure 8:
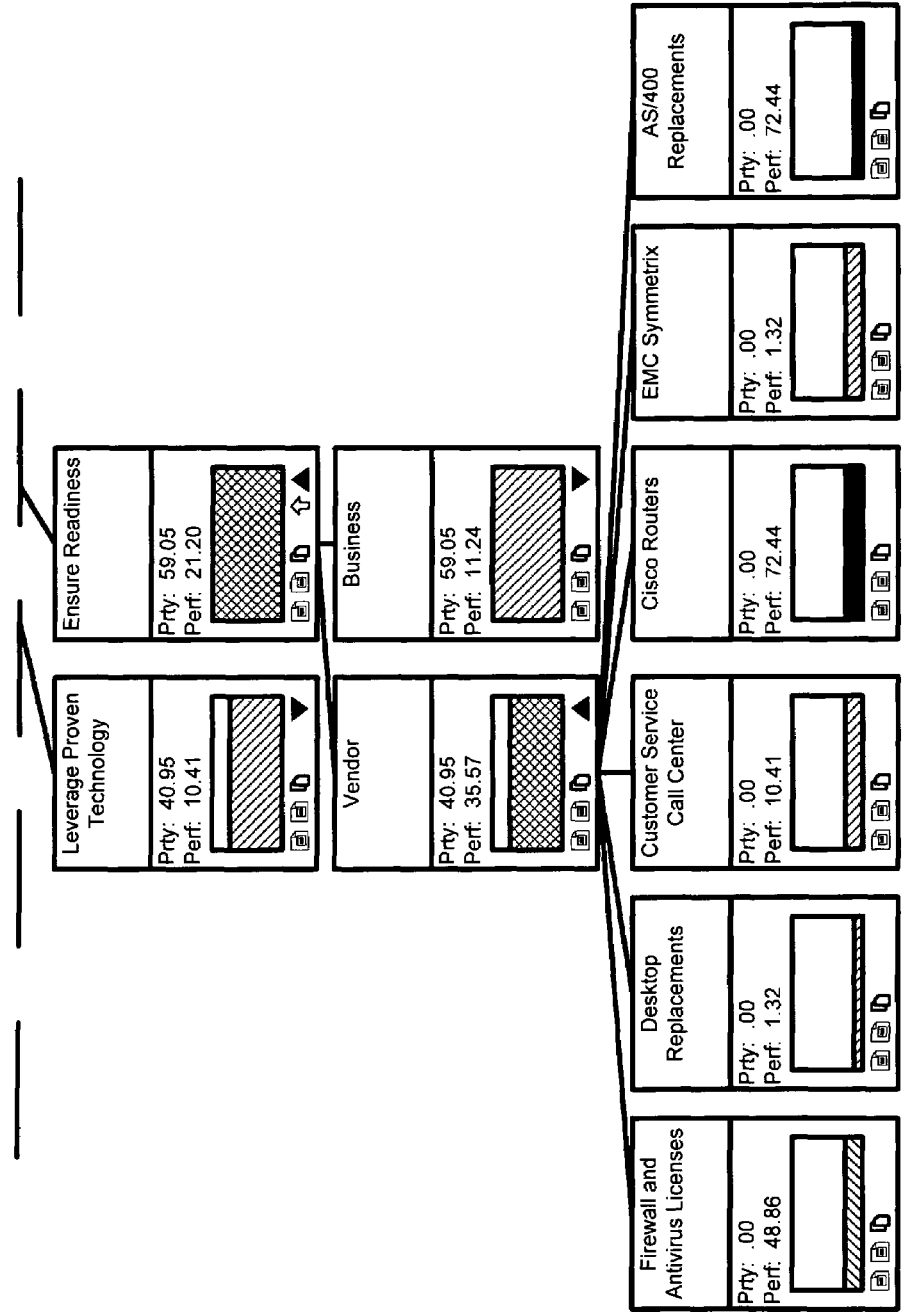
FIG. 8 is part of a screenshot showing the rolling up of earned value as per an embodiment of an aspect of the present invention.

Each activity's performance, multiplied by the priority of the covering objective to which it contributes, can be thought of as representing the earned value of the activity as illustrated in FIG. 8. The performance can be assigned or derived from one or more measures. Each activity can be evaluated by a different set of factors/measures, three examples of which are shown in FIG. 4. A rating scale for a "simple ratings" of an activity is shown in FIG. 5. A rating scale for the cost factor of a cost/schedule/scope set of measures is shown in FIG. 6. A ratings scale for the throughput factor of a Throughput/Inventory/Operational expense set of measures is shown in FIG. 7. Other sets of measures, nested to any number of levels can be applied and other formula translations, such as step functions and utility scales can be applied. U.S. Pat. No. 6,850,891 entitled, "Method and system of converting data and judgments to values or priorities" to Forman presents an example of one way to do this.

Referring to FIG. 8, the performance of each of the six activities may be determined using methods such as those described. Here, 'vendor' serves as the covering objective or parent node. The priorities of the activity may be calculated by normalizing the values in which the activities are anticipated or expected to contribute to the covering objective as determined in a traditional AHP planning or alignment model approach. In essence, either ratio-scaled measure(s) or performance measure(s) or both may be normalized with respect to an "ideal" activity.

To generate a rolled up performance measure, it is preferable to roll up at least one performance measure from the lower level of the hierarchy to the higher level. In this process, rolling up a performance measure typically uses the dot product of the performance vector and the priority vector to calculate the rolled up earned value for the covering objective. In this example, the rolled up performance measure with respect to earned value for Vendor is 0.3557 or 35.57%. It should be noted that earned value can also be further rolled up in the hierarchy to calculate the dot product of the cluster of nodes' performance and priority vectors, in which the latter may be determined using a traditional AHP planning or alignment model approach.

The step of rolling up at least one performance measure may include using a weighted average of at least two performance measures from at least two factors. The weights used in calculating the weighted average may include any number of values including but not limited to: prioritie(s) associated with levels in the hierarchy, one or more activities. Additionally, the weights may include an arbitrarily specified weight or a derived weight. Derived weights may be derived from another model, such as an AHP performance model. The AHP model, whose purpose is to model and prioritize factors for planning/alignment may or may not have the same structure as the performance model but the priorities of the activities may be the expected performance, rather than actual.

Figure 2:
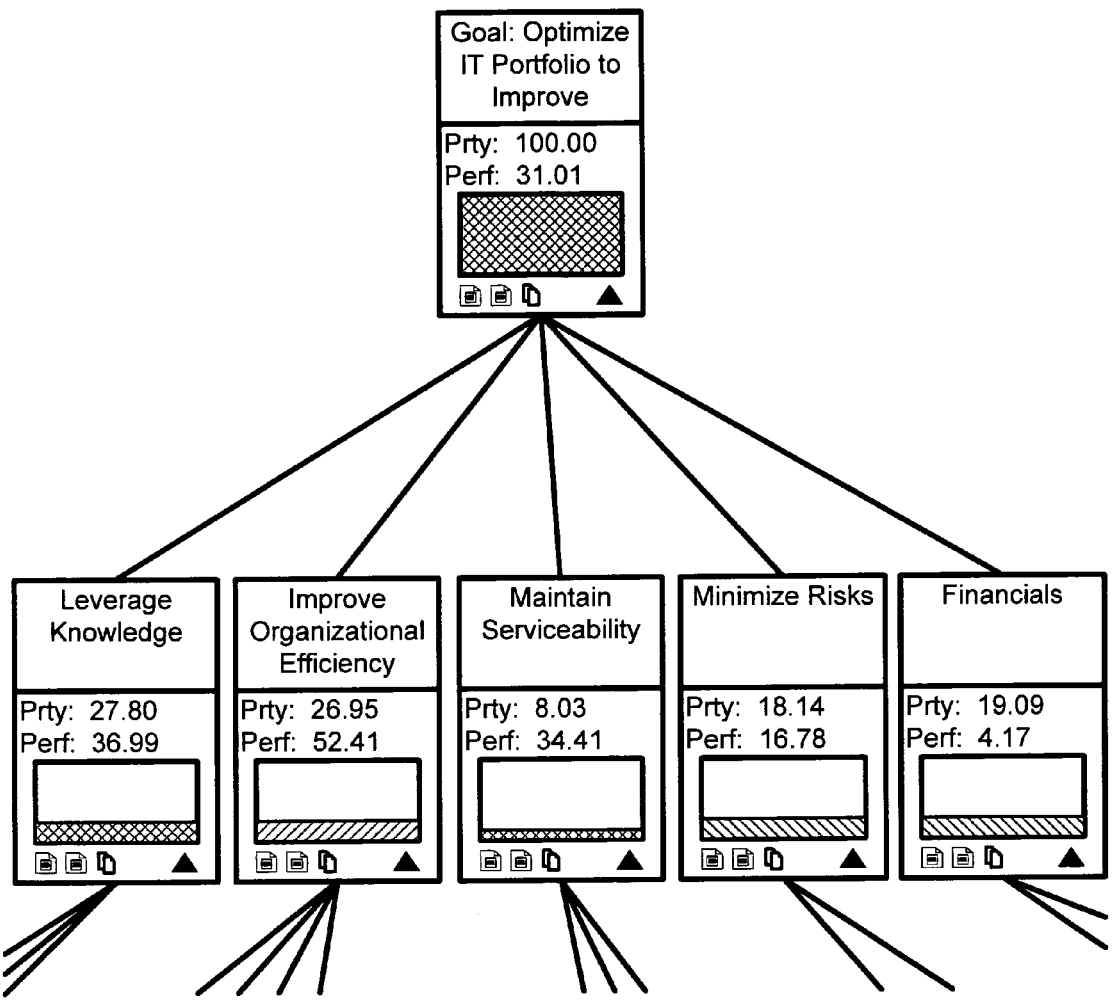
FIG. 2 is part of a screenshot showing an expanded view of a top hierarchy of factors as per an embodiment of an aspect of the present invention.
Figure 9:
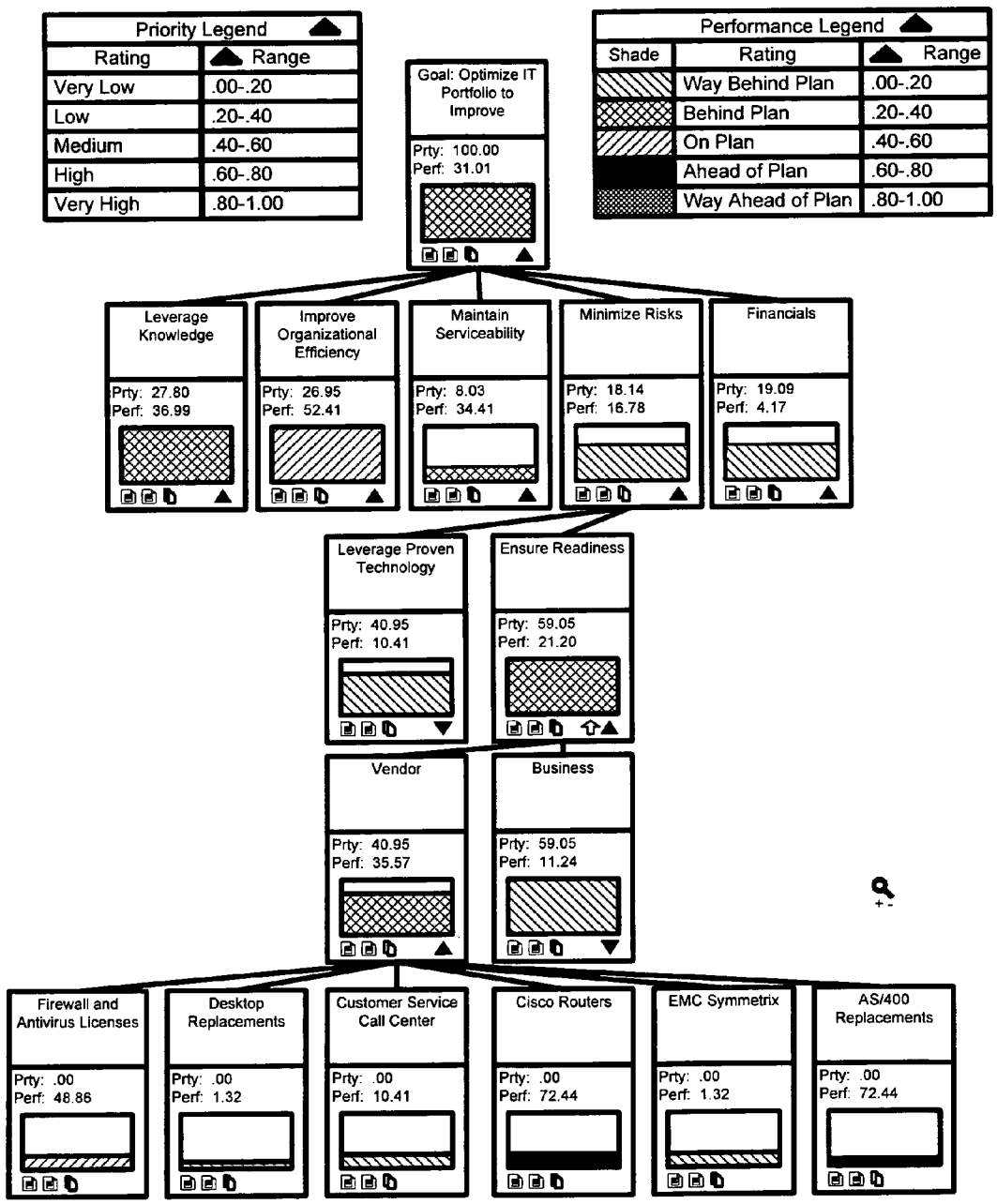
FIG. 9 is part of a screenshot showing a "dashboard view" as per an embodiment of an aspect of the present invention.
Figure 10:
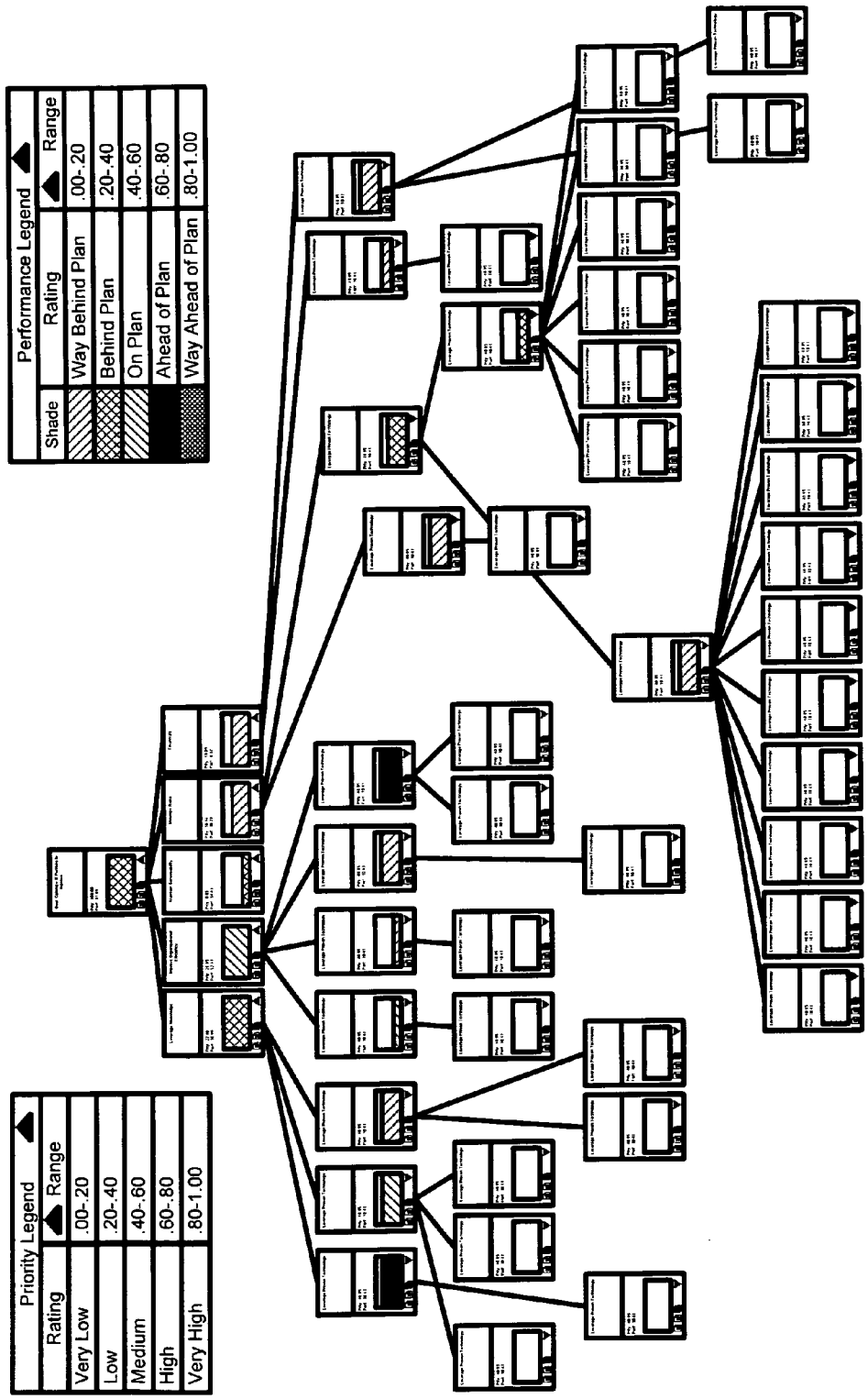
FIG. 10 is part of a screenshot showing a "wallboard view" with a portion collapsed as per an embodiment of an aspect of the present invention.
Figure 11:
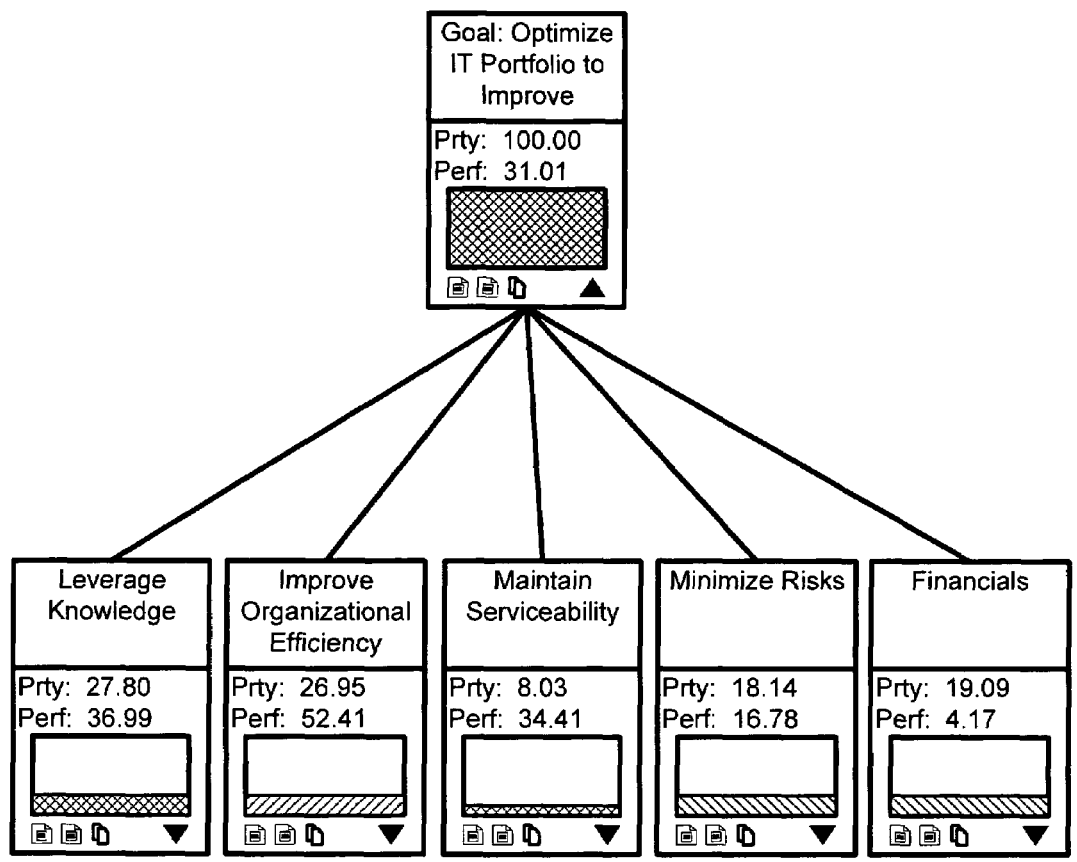
FIG. 11 is part of a screenshot showing a "wallboard view" with all but Goal and top level cluster collapsed as per an embodiment of an aspect of the present invention.

Once a performance measure and/or a rolled up performance measure is generated, it may be communicated in a variety of ways, such as a display or report. The rolled up earned values may be communicated by displaying "dashboard" and "wallboard" views. A "dashboard" view, as portrayed in FIG. 9, includes of a portion of the hierarchy where nodes in a cluster at the lowest level are drawn so that each of their peers and accompanying ancestry (e.g., parent and the peers of each parent) is displayed. A "wallboard" view, as illustrated in FIGS. 1, 10 and 11, displays all of the nodes in a cluster of nodes together. In particular, where a node has multiple parents, such node may be shown either once for each parent node or once connected to all of its parent nodes.

Color coded legends for ranges of priorities and performance may be included in the displays to ease understandability of the content being displayed. The range names and colors are preferably customizable. The display of the actual priorities and performance measures, as ratio-scaled measures, may be more accurate than the words or colors.

U.S. Pat. No. 4,613,946, entitled "Method and apparatus for generating hierarchical displays" discloses how to generate similar hierarchical displays. As one portion of the hierarchy is expanded, it may be useful to automatically collapse other portions to make room for the display of the expanding portion.

Figure 14:
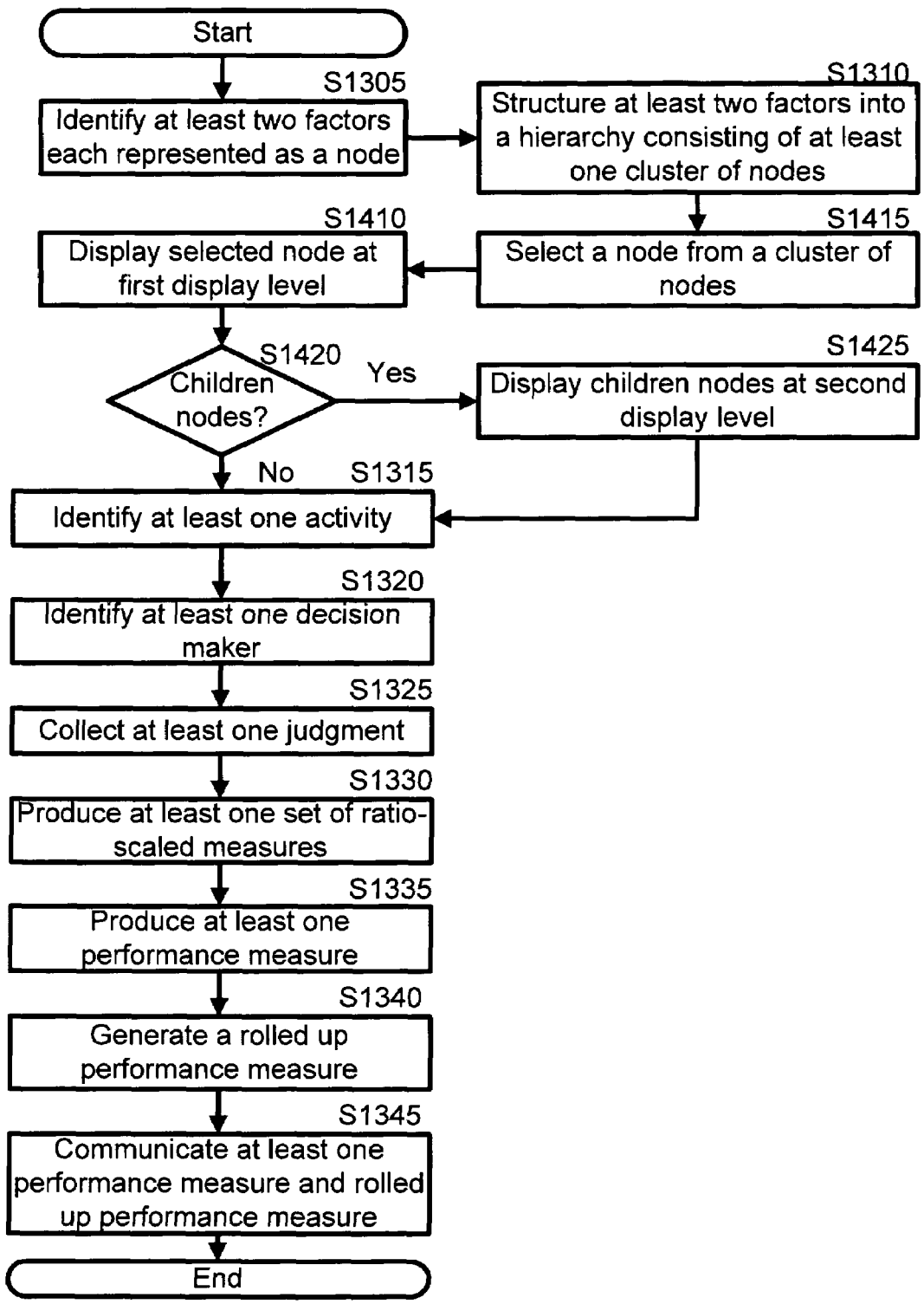
FIG. 14 is a flow diagram showing an embodiment of an aspect of the present invention.

As shown in FIG. 14, the present invention may also allow an operator to use the selection mechanism to select a node from a cluster of nodes (See S1415), and to display such selected node at the first display level (S1410). If the selected node has children nodes (S1420), then the operator may also use the selection mechanism to display the children nodes at the second display level (S1425). Moreover, an operator may have the freedom to select a displayed node and hide all nodes below the display level of the selected displayed node.

Figure 15:
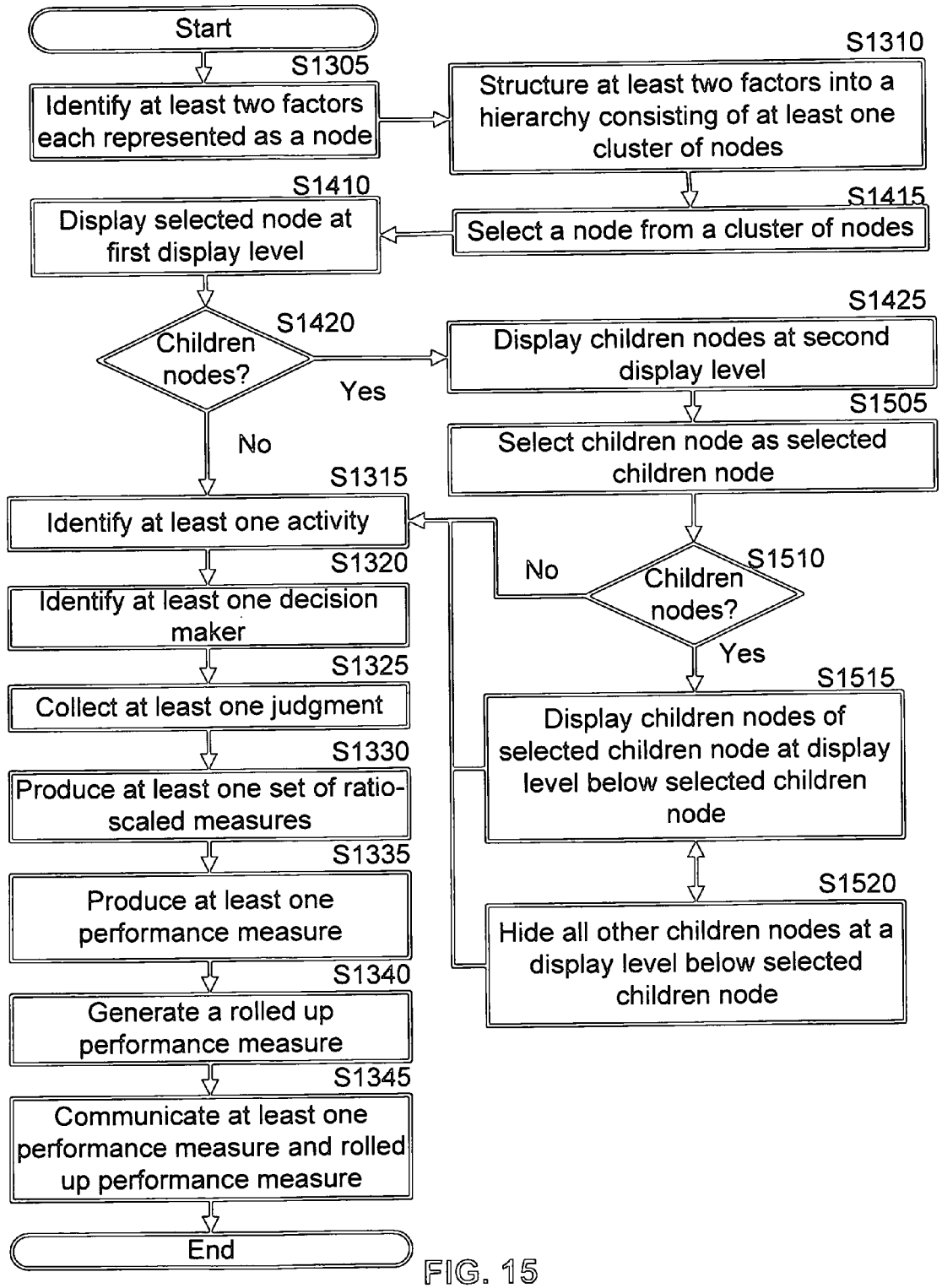
FIG. 15 is a flow diagram showing an embodiment of an aspect of the present invention.
Figure 16:
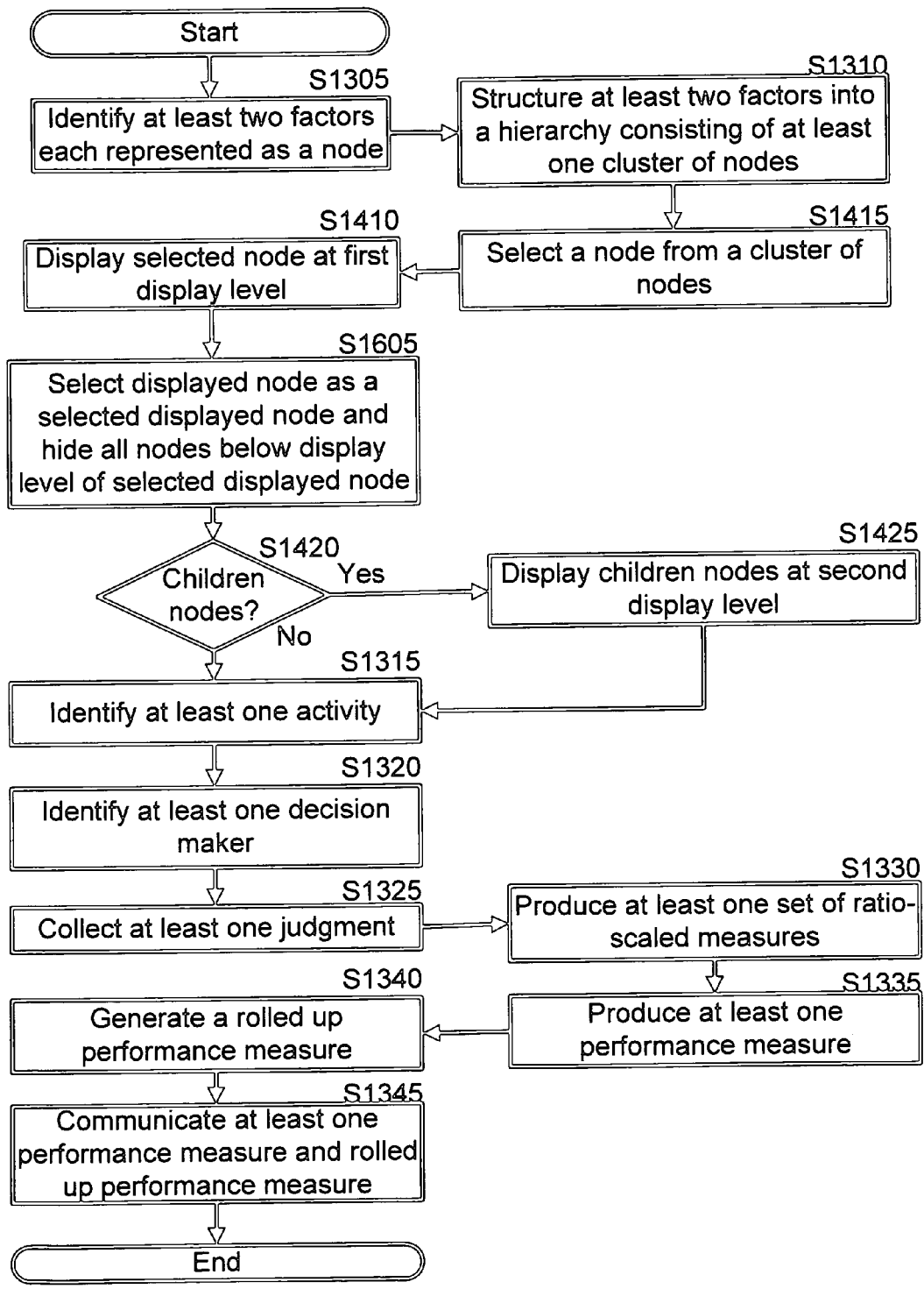
FIG. 16 is a flow diagram showing an embodiment of an aspect of the present invention.
Figure 17:
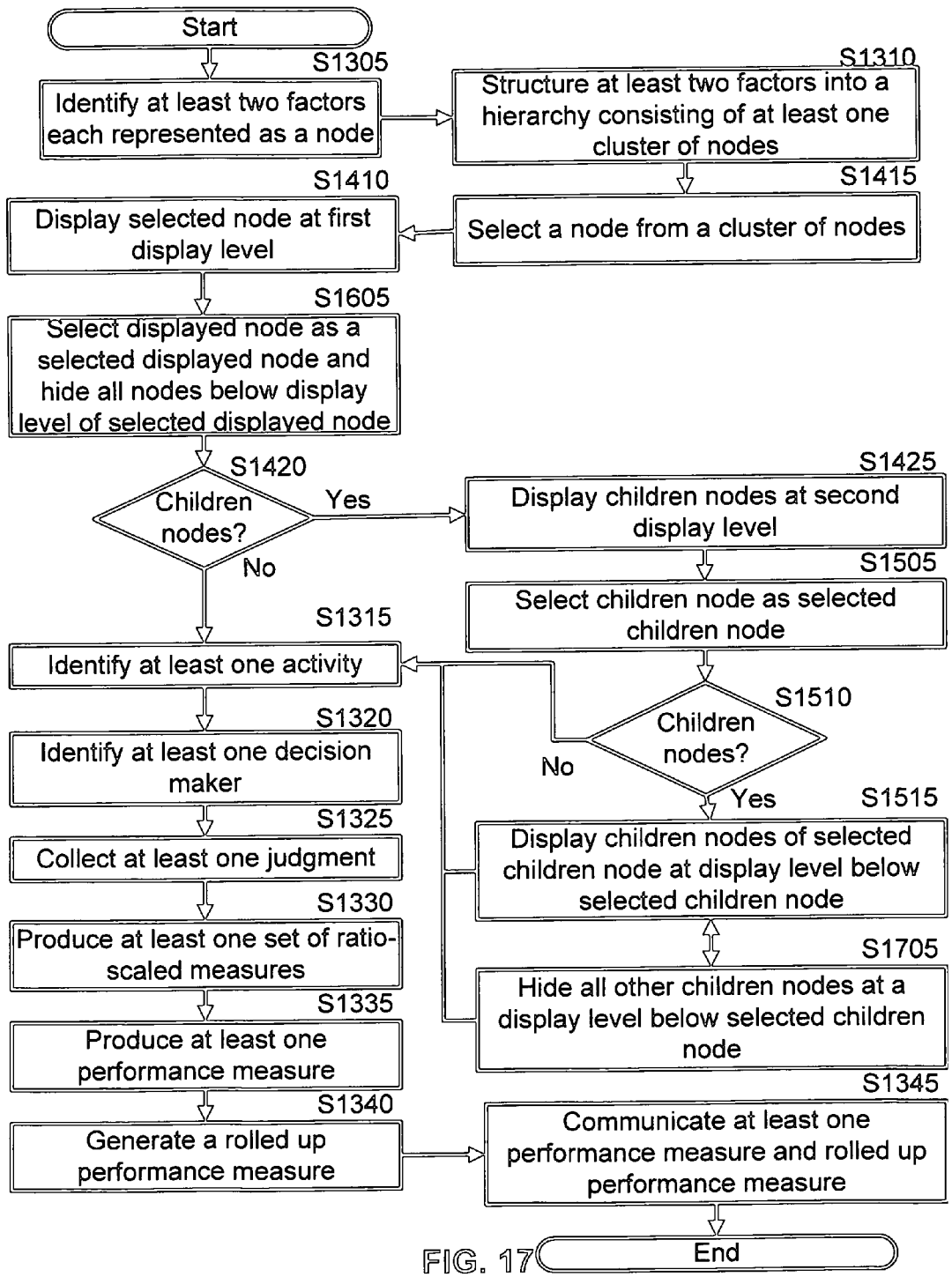
FIG. 17 is a flow diagram showing an embodiment of an aspect of the present invention.

In addition, FIG. 15 shows how the present invention may also permit the operator to display additional levels of a cluster of nodes by selecting one of the child nodes (S1505). Where a selected child node has children nodes (S1510), the operator has the ability to display those children nodes (S1515), as well as the ability to hide all other children nodes (S1520), at the display level below the selected child node. Furthermore, as in the selection of a node from a cluster of nodes, the operator may have the freedom to select a displayed node and hide all nodes below the display level of the selected displayed node (S1605). As one skilled in the art will recognize, these steps may be taken in differing orders. For example, FIG. 17 shows an alternate combination of steps previously shown in FIGS. 13-16.

To lessen operator confusion in selecting activity nodes, the present invention provides ways of differentiating a selected child node as an activity node. The selected child node may be displayed using a distinguishable visible presentation, such as different colors, shapes, etc. In another way, the selected child node may be displayed on a grid. Alternatively, it may be displayed in a list. Yet, in another method, at least one performance model relevant to the selected child node may be displayed. Or, data relevant to the selected child node may be displayed.

Figure 12:
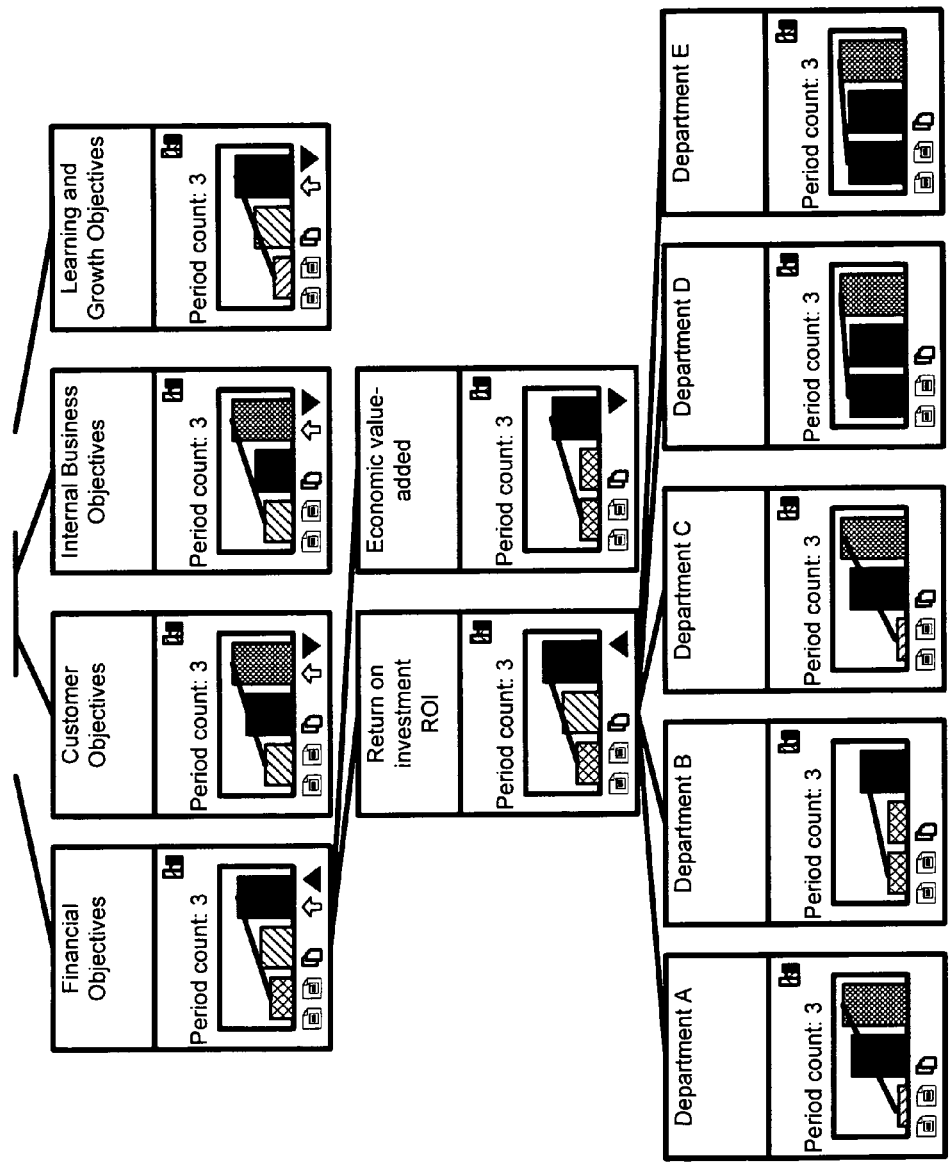
FIG. 12 is part of a screenshot showing multi-period trends as per an embodiment of an aspect of the present invention.
Figure 13:
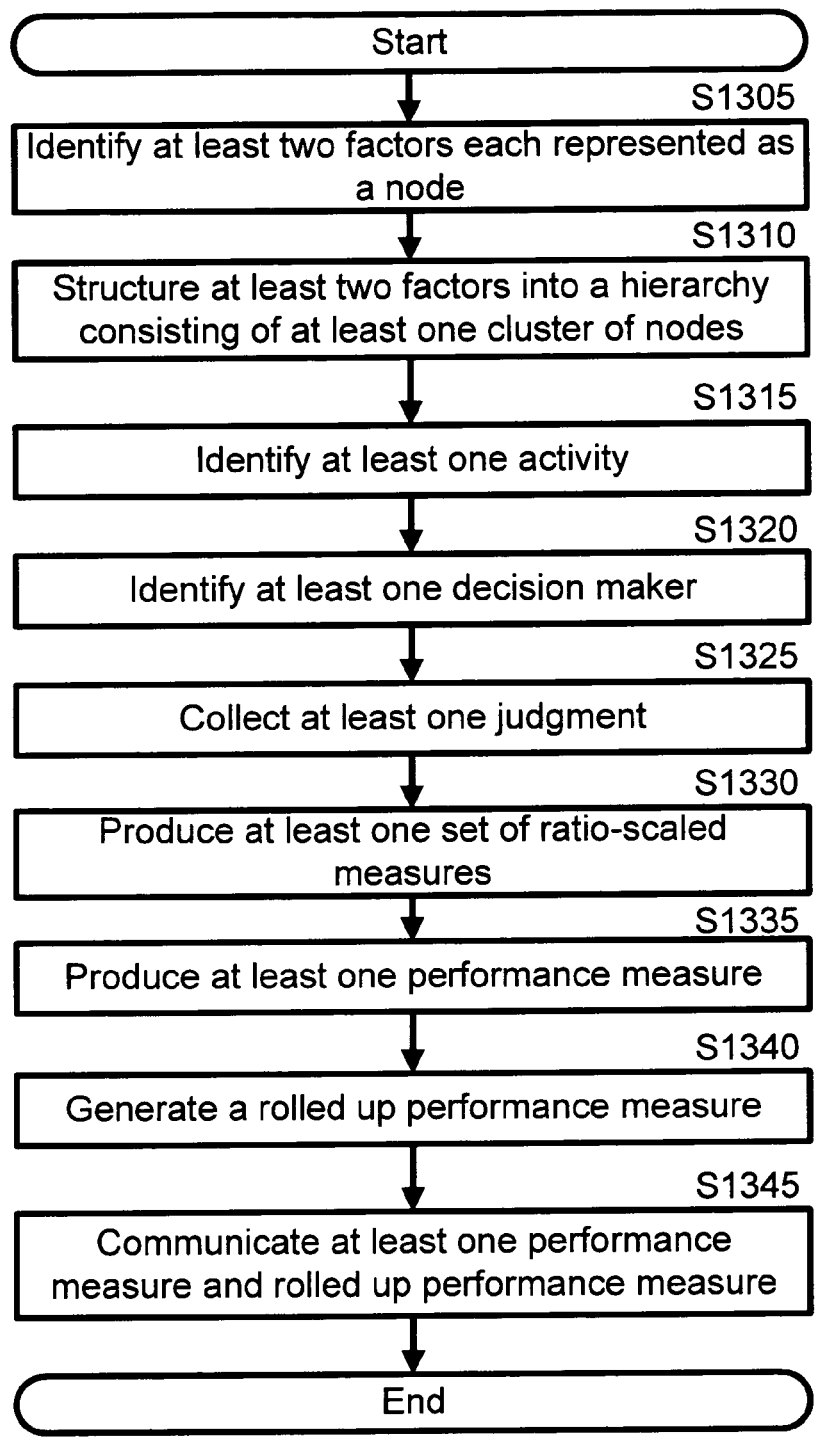
FIG. 13 is a flow diagram showing an embodiment of an aspect of the present invention.

The hierarchy may comprise of a multitude of hierarchies. Each of the multitude of hierarchies may represent a time period. There may be a measurement (including but not limited to performance measures and rolled up performance measures) and display for each of time periods. In the case where there is more than one period, trends can be displayed in either the 'dashboard' or 'wallboard' displays. Trends in the dashboard display are illustrated in FIG. 12. Where there exist differences between time periods and time trends for the performance measure(s) and rolled up performance measure(s), the present invention allows for the differences to be calculated and displayed.

Decision makers may be selected for their role in evaluating and/or viewing a node (or data related to or included in the node such as objectives and activities). The role may include such things as: displaying nodes as an element of a hierarchy, selecting a decision maker to have access to an element of a hierarchy, or viewing which of the decision makers has access to an element. Nodes may be represented (and displayed) as an element of a hierarchy as a cell in a grid. In the second case, the selection may be made by clicking either individual elements in the hierarchy or grid, or groups of elements. Such groups may be defined as elements in the hierarch below the one selected, or defined as all cells in a row or column of the grid. Separate color coded indicators may be used to specify that a selected element has a property allowing for no access, partial access (some but not all have access) or all access.

The foregoing descriptions of the preferred embodiments of the present invention have been presented for purposes of illustration and description. They are not intended to be exhaustive or to limit the invention to the precise forms disclosed, and obviously many modifications and variations are possible in light of the above teaching. The illustrated embodiments were chosen and described in order to best explain the principles of the invention and its practical application to thereby enable others skilled in the art to best utilize the invention in various embodiments and with various modifications as are suited to the particular use contemplated. For example, one skilled in the art will recognize that the present invention may be used to display and manipulate data in a hierarchical organization related to making decisions. However, one skilled in the art will recognize that the present invention could be used with other applications of hierarchically organized data, such as data organized in a database or data describing the properties of a physical multi-element system.

What is claimed is:

1. A tangible computer-readable medium encoded with a computer program for measuring and displaying measures, wherein execution of said computer program by one or more processors causes said one or more processors to perform the steps of:

a. identifying at least two factors, each of said at least two factors represented as a node;

b. structuring at least two of said at least two factors into a hierarchy, said hierarchy consisting of at least one cluster of nodes;

c. identifying at least one activity;

d. identifying at least one decision maker;

e. collecting at least one judgment on at least one of said at least two factors from at least one of said at least one decision maker;

f. producing at least one set of ratio-scaled measures of said at least two factors from said at least one judgment;

g. producing at least one performance measure of at least one of said at least one activity with respect to at least two of said at least two factors, at least one of said at least one performance measure determined using a translation function;

h. generating rolled up performance measures by rolling up at least one of said at least one performance measure from the lower levels of said hierarchy to the higher levels of said hierarchy; and i. communicating said at least one performance measure and said rolled up performance measures.

2. A tangible computer-readable medium according to claim 1, wherein nodes within said clusters of nodes each have a priority derived using pairwise comparisons or data.

3. A tangible computer-readable medium according to claim 1, further including the steps of:
   a. selecting a node from said cluster of nodes as a selected node;
   b. displaying said selected node at a first display level; and
   c. if said selected node has children nodes, displaying said children nodes at a second display level.

4. A tangible computer-readable medium according to claim 3, further including the step of displaying additional levels of said cluster of nodes by iteratively:
   a. selecting one of said children nodes as a selected child node; and
   b. if said selected child node has children nodes:
      i. displaying those children nodes at a display level below said selected child node; and
      ii. hiding all other children nodes at a display level below said selected child node.

5. A tangible computer-readable medium according to claim 4, performing at least one of the following steps when said selected child node is an activity node:
   a. display said selected child node using a distinguishable visible presentation;
   b. display said selected child node on a grid;
   c. display said selected child node in a list;
   d. display at least one performance models relevant to said selected child node; and
   e. display data relevant to said selected child node.

6. A tangible computer-readable medium according to claim 3, further including the steps of:
   a. selecting a displayed node as a selected display node; and
   b. hiding all nodes below the display level of said selected display node.

7. A tangible computer-readable medium according to claim 4, further including the steps of:
   a. selecting a displayed node as a selected display node; and
   b. hiding all nodes below the display level of said selected display node.

8. A tangible computer-readable medium according to claim 1, wherein all of the nodes in said cluster of nodes are displayed together.

9. A tangible computer-readable medium according to claim 8, wherein a node that has multiple parents is shown in one of the following ways:
   a. once for each parent; or
   b. once connected to all the parents.

10. A tangible computer-readable medium according to claim 1, wherein at least one of said at least one activity is displayed at the lowest level of at least one of said at least one cluster of nodes.

11. A tangible computer-readable medium according to claim 1, wherein information is communicated for at least one node within said clusters of nodes.

12. A tangible computer-readable medium according to claim 11, wherein said information includes:
   a. a priority;
   b. a performance;
   c. a note;
   d. an information document;
   e. a consolidated note, consisting of notes from all or a selected subset of participants; or
   f. any combination of the above.

13. A tangible computer-readable medium according to claim 11, wherein said information is communicated:
   a. numerically;
   b. textually;
   c. graphically;
   d. verbally (in a defined range);
   e. using color codes (in a defined range); or
   f. any combination of the above.

14. A tangible computer-readable medium according to claim 1, wherein said hierarchy is a multitude of hierarchies, each of said multitude of hierarchies representing a time period.

15. A tangible computer-readable medium according to claim 14, wherein differences between said time period and time trends for said at least one performance measure and said rolled up performance measures are calculated and displayed.

16. A tangible computer-readable medium according to claim 1, wherein at least one of the following is normalized with respect to an ideal activity:
   a. at least one of said at least one set of ratio-scaled measures; and
   b. at least one of said at least one performance measure.

17. A tangible computer-readable medium according to claim 1, wherein said translation function is one of the following:
   a. a direct function;
   b. a ratings function;
   c. a step function; and
   d. a utility curve.

18. A tangible computer-readable medium according to claim 1, wherein said step of rolling up at least one of said at least one performance measure includes using a weight average of at least two of said at least one performance measure from said at least two factors.

19. A tangible computer-readable medium according to claim 18, wherein the weights used in calculating said weighted average uses priorities associated with levels in said hierarchy.

20. A tangible computer-readable medium according to claim 18, wherein the weights used in calculating said weighted average uses at least one of said at least one activity.

21. A tangible computer-readable medium according to claim 20, wherein said weights include at least one of the following:
   a. an arbitrarily specified weight; and
   b. a derived weight.

22. A tangible computer-readable medium according to claim 21, wherein said derived weight is derived from an Analytic Hierarchy Process model.

23. A tangible computer-readable medium according to claim 1, further including at least one covering factor, each of said at least one covering factor being one of said at least two factors that is at the lowest level of said hierarchy, and wherein at least one of said at least one activity is selected to contribute to at least one said at least one covering factor.

24. A tangible computer-readable medium according to claim 1, wherein said step of "collecting at least one judgment on at least one of said at least two factors from at least one of said at least one decision maker" includes only collecting at least one judgment on at least one of said at least two factors from at least one of said at least one decision maker when said at least one decision maker has been selected to evaluate said at least one judgment.

25. A tangible computer-readable medium according to claim 1, wherein said step of generating a rolled up performance measure is performed for at least two periods.

26. A tangible computer-readable medium according to claim 25, wherein said step of communicating said at least one performance measure and said rolled up performance measures is performed for at least two of said at least two periods.

27. A tangible computer-readable medium according to claim 26, wherein said step of communicating said at least one performance measure and said rolled up performance measures further includes communicating at least one trend over at least two of said at least two periods.

28. A tangible computer-readable medium according to claim 1, wherein said step of producing at least one performance measure includes using at least one selected performance measure for each of said at least one activity, said at least one selected performance measure is independently selected for each of said at least one activity from a multitude of performance measures.

29. A tangible computer-readable medium according to claim 28, wherein said at least one selected performance measure includes at least one of the following:

a. a direct assignment of a performance measure; and
   b. a derived performance measure, said derived performance measure derived from at least one of the following:
      i. an Analytic Hierarchy Process model; and
      ii. an Analytic Hierarchy Process submodel.

30. A tangible computer-readable medium according to claim 24, wherein at least one of said at least one decision maker is selected for their role in evaluating and/or viewing at least one of said node, said role including at least one of the following:

a. displaying at least one said nodes as an element of said hierarchy;
   b. selecting at least one of said at least one decision maker to have access to at least one said element of said hierarchy; and
   c. viewing which of said at least one decision maker has access to a at least one said element.

* * * * *